Patented Aug. 7, 1928.

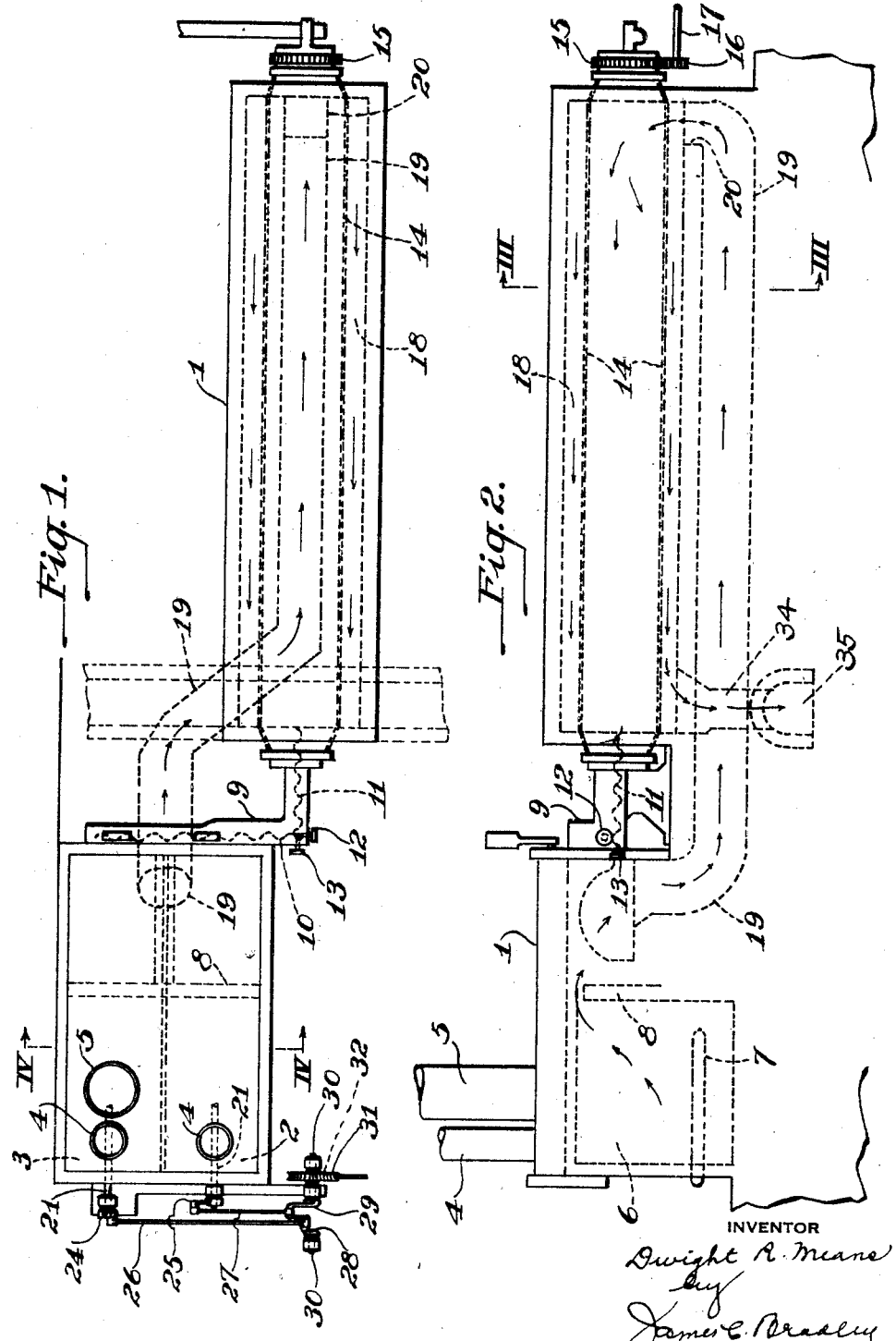

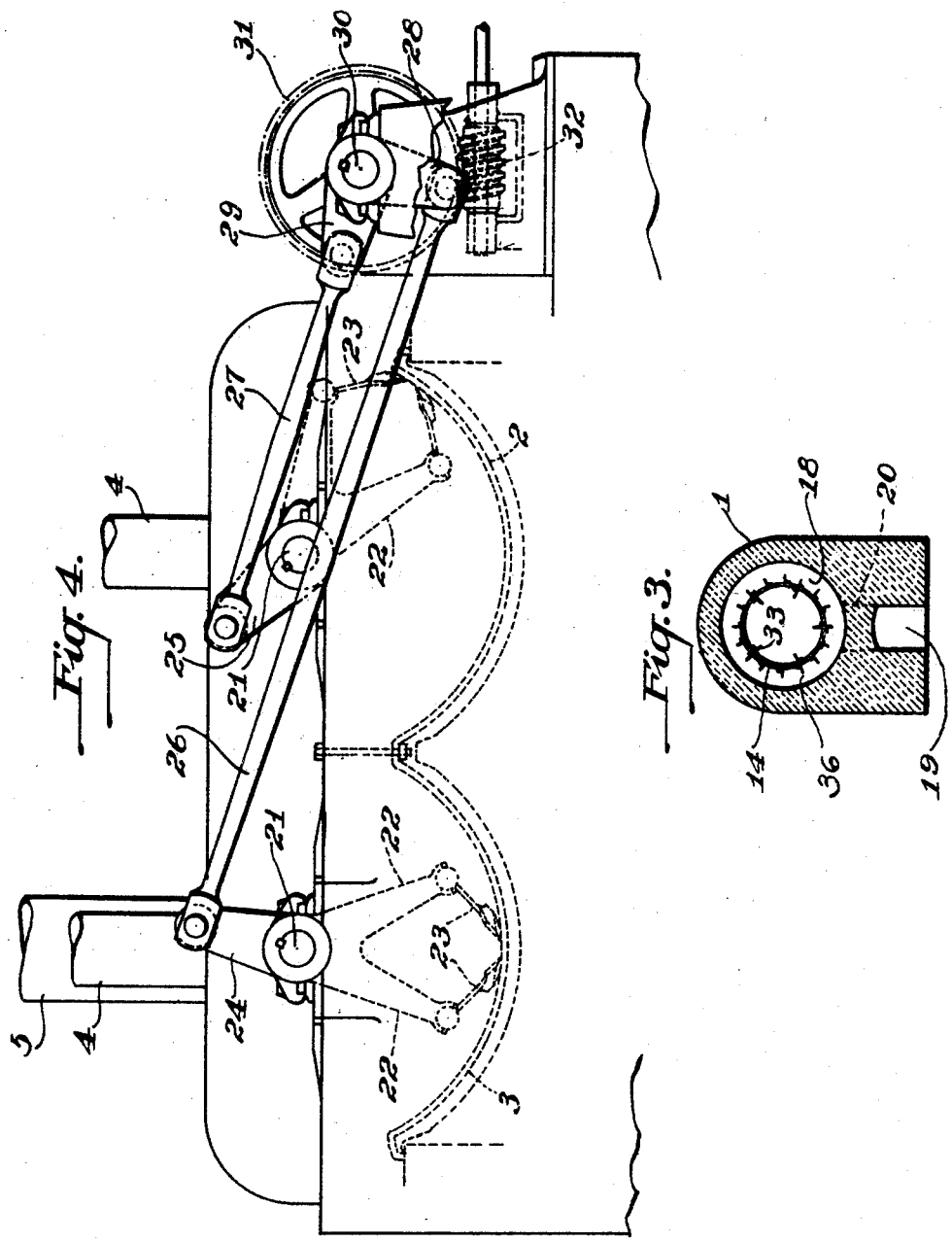

1,679,486

UNITED STATES PATENT OFFICE.

DWIGHT R. MEANS, OF MEDINA COUNTY, OHIO, ASSIGNOR TO PITTSBURGH PLATE GLASS COMPANY, A CORPORATION OF PENNSYLVANIA.

SODA-ASH FURNACE.

Application filed October 14, 1926. Serial No. 141,597.

The invention relates to soda ash furnaces for calcining crude sodium bicarbonate. Heretofore, this has been done either in what are known as Thelen pans, which comprise fixed containers, or pans provided with scrapers or agitators working over the bottom for agitating the material, or in rotary furnaces. Both of these forms of apparatus have certain disadvantages which it is the object of the present invention to avoid. The Thelen pan has a relatively small heating surface, so that its capacity is limited, if operated at low temperatures, and if operated at high temperatures, the flue gases are of high temperatures so that the efficiency is low. It is also more difficult to maintain tight gas joints than with a rotary furnace, and the mechanical difficulties incident to the agitating mechanism call for a furnace of less length than is required for high efficiency. The flow of gas from these pans is also more uneven than is the case with a rotary furnace, as each time the scraper or agitator moves over the bottom bringing a new body of soda into contact with the higher heated shell, there is a puff of gas. It is desirable to maintain a slight vacuum in the pan, in order that any leaking will be inward, and the uneven pressure incident to the puffs prevents this condition from being maintained. The rotary furnace also shows pronounced disadvantages. One of these is the greater tendency of the soda to stick to the shell, which in some cases causes it to burn out. To avoid this sticking, it has been the practice to feed in 20 to 30 per cent of dry soda, which correspondingly reduces the capacity and the efficiency of the furnace. As the rotary furnace is fired externally and as it is very long and supported at the ends, it tends to sag under the heat conditions encountered, particularly if their rotation is interrupted. The shell of a rotary furnace as ordinarily operated is hotter than the shell of the Thelen pan and the gases (steam and carbon dioxide) reach a very high temperature, usually from 300 to 400 degrees F., which is much higher than those in a Thelen pan. This means a higher operating cost for the rotary furnace, since the additional heat supplied to the gases is a loss, and as the carbon dioxide must be cooled to 70 to 80 degrees F. before use, additional expense is involved in the cooling.

Briefly stated, the present invention involves the use of one or more Thelen pans in combination with a rotary furnace in such a way as to avoid the disadvantages, as above set forth. The Thelen pan or pans perform a preliminary partial calcining, after which the material passes to the rotary furnace for the final calcining, the flue gases from the furnace beneath the Thelen pans passing along the rotary furnace for heating it also. The pans with the rotary furnace can be made in larger units with corresponding capacity, such large units being relatively cheaper to operate than smaller units. The fire is applied beneath the pans only, and as these may be made of cast iron, the construction stands up well under the heat. The sticking of the soda in the rotary furnace is avoided, due to the preliminary calcining in the pans, and it is unnecessary to add any calcined soda in the furnace, as has heretofore been required, as above set forth. Since the gases from the furnace under the Thelen pans have cooled down by the time the rotary furnace is reached, there is no danger of injuring the steel shell, and fins may be used upon such shell under these conditions, to increase its efficiency, without any danger of burning off. It is also possible to make the rotary furnace longer, because of lower heat conditions, without danger of sagging, so that its efficiency may be increased, as the flue gases have more time to give up their heat to the shell of the furnace, and have a greater area upon which to act. The arrangement also gives an opportunity to carry the hot carbon dioxide and superheated steam (formed in the rotary furnace) along and over the soda in the conveyer between the rotary furnace and the pan and in the pan itself, thus heating the soda and conserving heat. The use of two Thelen pans instead of a single one also involves a further advantage (although the construction may be used with a single pan and the invention is not limited to the use of two pans), since with two pans having the agitators timed so as to act alternately, the puffs of gas come alternately and the flow of gas is thus rendered more uniform. One embodiment of the invention is illustrated in the accompanying drawings, wherein:

Figure 1 is a diagrammatic plan view of the apparatus, Fig. 2 is a diagrammatic side elevation. Fig. 3 is a transverse section on the line III—III of Fig. 2. And Fig. 4 is an end elevation looking toward the left hand end of the apparatus, as shown in Fig. 1.

Referring to the drawings, 1 is a casing surrounding the pair of Thelen pans 2, 3 of the usual cast iron construction. Each of these pans is provided with an inlet pipe 4 through which the bicarbonate to be calcined is supplied to the pans and an outlet pipe 5 for carbon dioxide gas is provided from the casing above the pan 3. Beneath the left hand end of the Thelen pans is a furnace 6 provided with a stoker 7 and having a bridge wall 8 at its right hand end. The pans at their right hand end communicate with a casing 9 in which are located the spiral conveyers 10 and 11 mounted upon shafts having at their ends the pulleys 12 and 13 by means of which the material from the pans is carried laterally and then forwardly into the shell 14 of the rotary furnace.

The rotary furnace may be of any approved form and comprises the shell 14 mounted in suitable bearings and provided with a gear 15 driven from the gear 16 on the shaft 17, by means of which the shell may be turned from any suitable source of power. The rotary furnace is mounted in a suitable setting 18 of brick spaced away from the shell 14 to provide an annular chamber 18 for the passage of flue gases for heating the shell and its contents. The heat for the rotary furnace is supplied by the flue gases from the furnace 6. Such gases pass over the bridge wall 8 and through the flue 19 beneath the rotary furnace to the right hand end thereof where they flow upward through the passage 20 to the annular chamber 18 heretofore referred to. These gases then pass to the left, as indicated by the arrows and discharge downwardly through the passage 34 to the tunnel 35 leading to the stack. This method of heating gives a high degree of economy, since the gases are applied both to the Thelen pans and to the rotary furnace and are given a long period of travel over the surface of the shell 14. As a result, their temperature is relatively low when discharged to the tunnel 35. The heat absorbing capacity of the shell 14 is further increased by the use of the fins 36 extending along the shell and consisting of angle irons. Because of the relatively low temperature of the gases when they reach the right hand end of the shell, all danger of burning out the shell or fins is avoided, as heretofore referred to. The hot carbon dioxide gas and superheated steam from the rotary furnace is permitted to escape from the left hand end thereof through the casing 9 from which they discharge through the Thelen pans to the outlet 5. This also involves a feature of economy, as heretofore referred to, since the gases in their passage through the casing 9 and through the Thelen pans in a direction contrary to the direction of movement of the soda, serve to heat such soda, thus reducing the amount of heat required in the rotary furnace.

The method of operating the scraping devices for the Thelen pans is shown in Figs. 1 and 4. As here shown, a shaft 21 extends longitudinally of each pan and carries the scraper arms 22, upon which are mounted the scrapers 23. The shafts 21 are oscillated by means of the cranks 24 and 25 and the connecting rods 26 and 27. The ends of the connecting rods are connected to the crank arms 28 and 29 keyed to a countershaft 30. This shaft is rotated by means of the worm wheel 31, also keyed to the shaft and the worm 32, which is driven from any suitable source of power, not shown. The rotation of the cranks 28 and 29, causes the scraper arms to oscillate back and forth so that the scrapers move over the surfaces of the pans and scrape the soda ash loose and agitate it. This method of scraping and agitation is well known in the art and serves to speed up the calcining operation and prevent the material of the pans from becoming overheated. The use of two Thelen pans instead of a single one is advantageous (although not necessary) as the agitators can be so timed that the puffs of gas, incident to the fresh material coming into contact with the surface of the pans, alternate and give a fairly constant flow. There are also certain mechanical advantages incident to using two small units rather than a singe large one.

In operation, the sodium bicarbonate is fed through the inlet pipes 4 4 and as the pans at this end become filled up, the material works forward and finally discharges into the casing 9 carrying the screw conveyor 10. The pans are run far beyond their ordinary capacity, so that the product as thus discharged is only partially calcined, the process being completed after the material is carried by the conveyers into and through the rotary furnace. The remaining bicarbonate is thus decomposed in the rotary furnace and any remaining moisture driven off. The gases which are thus driven off, are forced to the left under the pressure generated, through the casing 9 and longitudinally of the Thelen pans to the casing outlet 5, thus acting in such movement to dry out the product, which is moving through the apparatus from the left hand end to the right hand end. The soda as it passes from the Thelen pans to the furnace is dried to such an extent that no sticking occurs when it reaches the furnace, so that it is unnecessary to add any calcined soda ash to the furnace in order to prevent sticking, as has heretofore been found necessary, and no scraping means, such as chains or the like, are required in the rotary furnace in order to loosen the material and prevent sticking. The foregoing and other advantages incident to the construction and its method of operation will be readily apparent to those skilled in the art.

If desired, the stirring action in the rotary furnace may be increased by the use of longitudinal angles 33 welded to the interior of the shell 14, as indicated in Fig. 3. The construction of the rotary furnace may also be simplified, if desired, by arranging the flues so that the gases for heating the shell pass from the left hand end (Fig. 2) to the right hand end, instead of the reverse, as heretofore described, the invention in its broader aspects not being limited in this particular.

What I claim is:

1. Apparatus for calcining soda, comprising a covered calcining pan arranged to discharge the calcined material at one end and provided with agitators, means for operating the agitators, a rotary furnace in position to receive the discharge from said pan, a combustion furnace beneath the pan, and means for conducting the heated gases from the combustion furnace along the shell of the rotary furnace.

2. Apparatus for calcining soda, comprising a covered calcining pan arranged to discharge the calcined material at one end and provided with agitators, means for operating the agitators, a rotary furnace in position to receive the discharge from said pan, a combustion furnace beneath the pan, and means for conducting the heated gases from the combustion furnace to the far end of the rotary furnace, and then forward in contact with the shell of the rotary furnace to the end thereof adjacent said pan, where they are discharged.

3. Apparatus for calcining soda, comprising a covered calcining pan arranged to discharge the calcined material at one end and provided with agitators, means for operating the agitators, a rotary furnace in position to receive the discharge from said pan, a combustion furnace beneath the pan, means for conducting the heated gases from the combustion furnace along the shell of the rotary furnace, and means for conducting the gases from the interior of the rotary furnace back to and through the space above said pan.

4. Apparatus for calcining soda, comprising a plurality of calcining pans each arranged to discharge the calcined material at one end and provided with agitators, means for operating the agitators, a rotary furnace having its inlet end adjacent the pans, a casing and transfer means therein leading from the discharge ends of the pans to said inlet end of the furnace, and means for heating said pans and said furnace.

5. Apparatus for calcining soda, comprising a covered calcining pan arranged to discharge the calcined material at one end and provided with agitators, means for operating the agitators, means for supplying material at one end of the pan, a rotary furnace having its inlet end adjacent the pan, a casing leading from the discharge end of the pan to said inlet end of the furnace, means for heating said pan and said furnace, and an outlet conduit leading from the end of the pan to which said material is supplied for conducting away the gases generated, both in the furnace and in the pan.

6. Apparatus for calcining soda, comprising a covered calcining pan arranged to discharge the calcined material at one end and provided with agitators, means for operating the agitators, a rotary furnace having its inlet end adjacent the pan, a casing and transfer means therein leading from the discharge end of the pan to said inlet end of the furnace, a combustion furnace beneath said pan, and means for conducting the gas from the combustion chamber along the shell of the rotary furnace.

7. Apparatus for calcining soda, comprising a covered calcining pan, a rotary furnace, means for heating the calcining pan, means for supplying the waste heat from said heating means to the rotary furnace to heat it, and means for conveying the partially calcined soda from the pan to the furnace.

In testimony whereof, I have hereunto subscribed my name this 20th day of September, 1926.

DWIGHT R. MEANS.